(12) United States Patent
Gluf, Jr.

(10) Patent No.: US 6,206,044 B1
(45) Date of Patent: Mar. 27, 2001

(54) BY-PASS SOLENOID WITH INTEGRAL CHECK VALVE

(75) Inventor: Carl G. Gluf, Jr., Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/458,471

(22) Filed: Dec. 9, 1999

(51) Int. Cl.[7] ............................ F04B 19/24; F15B 13/044
(52) U.S. Cl. .................................... 137/625.65; 417/53
(58) Field of Search ................................ 417/53, 57, 54; 303/115.4, 115.1; 137/625.65, 625.69, 624.27, 625.63; 251/337

(56) References Cited

U.S. PATENT DOCUMENTS

| | | | |
|---|---|---|---|
| 3,716,075 | * 2/1973 | Paul | 137/625.63 |
| 4,947,893 | * 8/1990 | Miller et al. | 137/625.65 |
| 4,971,114 | * 11/1990 | Ichihashi et al. | 137/625.65 |
| 5,191,827 | * 3/1993 | Kervagoret | 91/433 |
| 5,326,160 | * 7/1994 | Bayliss et al. | 303/113.2 |
| 5,513,673 | * 5/1996 | Slavin et al. | 137/625.65 |
| 5,571,248 | * 11/1996 | Seetharaman et al. | 137/625.65 |
| 5,577,534 | * 11/1996 | Ward | 137/596.17 |
| 6,109,162 | * 8/2000 | Tawada | 91/360 |

* cited by examiner

Primary Examiner—Teresa Walberg
Assistant Examiner—Jeffrey Pwu
(74) Attorney, Agent, or Firm—Daniel S. Kalka; Roger A. Johnston

(57) ABSTRACT

A by-pass solenoid (32) with an integral check valve assembly (36) for by-passing excess pump (16) fluid flow. The integral check valve assembly (36) positioned in a first chamber (120) of a valve sub-assembly (52) allows fluid flow from an inlet (34) to an outlet port (40) in a normal mode of operation. Upon actuation of the solenoid sub-assembly (50), the by-pass solenoid (32) diverts excess fluid flow to a by-pass port (42) for re-circulation during periods when fluid flow demand is low and still maintains a fairly constant system pressure. Check valve assembly (36) prevents re-circulated fluid from directly entering the working hydraulic circuit and maintains system pressure. The present invention advantageously provides a compact integral fluid flow control device for bleeding excess pump flow.

20 Claims, 7 Drawing Sheets

BY-PASS SOLENOID WITH INTEGRAL CHECK VALVE

BACKGROUND OF THE INVENTION

1. Field of the Invention

The present invention relates in general to a by-pass solenoid for a variable bleed flow system and method, and more particularly to a by-pass solenoid with an integral check valve for a hydraulic system and method for by-passing or bleeding excess flow of hydraulic fluid while maintaining a constant pressure.

2. Description of the Related Art

Solenoid actuated hydraulic valves are used in many types of machines and applications to control the flow of fluid (hydraulic or pneumatic) to and from fluid pressure devices, for example, hydraulic cylinders, hydraulic motors, pumps, etc. The valves are controlled by circuits which selectively energize the various solenoids in accordance with an intended operating sequence. Solenoid valves may be of the ON/OFF variety operating as either normally open or normally closed, or the solenoid valve may be a variable (proportional) force solenoid valve. A variable force solenoid valve is controlled by an electrical signal providing variable voltage or controlled current to provide an increasing or decreasing magnetic force on an armature for effecting movement of a spool valve. Movement of the spool valve results in an increase or decrease in fluid flow.

Solenoid valves have found recent application in automatic transmissions and power steering systems on some vehicles. The fluid pressure and/or flow is controlled to provide smooth gear shifting in the transmission, or to provide good steering wheel "feel" in power assist steering.

In electronic control applications for automatic transmissions, variable force solenoid valve assemblies are used to provide control over fluid pressures which are provided in response to electrical input signals supplied to the variable force solenoid assemblies by an engine control unit (ECU). The variable force solenoid valve assemblies are employed to regulate fluid control devices which cause the "shift-feel" of an automatic transmission.

Once such type of variable force solenoid valve is disclosed in U.S. Pat. No. 5,853,028 assigned to the Assignee of the present invention and incorporated herein by reference. U.S. Pat. No. 5,853,028 describes an improved variable force solenoid valve with a spool valve that experiences a minimum of oscillations and instability.

In an electronically controlled automatic transmission or a continuously variable transmission (CVT), it has become desirable to move the pump out from inside the transmission to a location where it may be operated directly from the engine of the vehicle. Since the engine speed will directly effect pump flow, a by-pass system is required to divert excess flow during high engine speed while maintaining a desired pressure. While a continuously variable pump may be employed for this type of application, a continuously variable pump is more expensive than a fixed displacement pump. So, it would be preferred to use the fixed displacement pump for cost reasons.

Consequently, there is a need for a simple, reliable hydraulic system and method to by-pass excess hydraulic fluid flow in a hydraulic circuit which can maintain a fairly constant fluid flow pressure. There exists a need for a fluid flow control device employed in the hydraulic system which allows return of excess fluid flow to the system reservoir, or allows re-circulation of excess fluid back to the pump inlet. The fluid flow control device would ideally offer a smaller size advantage along with being an integral flow control device.

BRIEF SUMMARY OF THE INVENTION

An object of the present invention is to provide a by-pass solenoid with integral check valve for use in a hydraulic system to bleed excess flow of hydraulic fluid in the hydraulic circuit while still maintaining a fairly constant system pressure. The by-pass solenoid in accordance with the present invention offers a compact, integral design.

Another object of the present invention is to provide a hydraulic system for by-passing excess pump flow in a hydraulic circuit that utilizes a by-pass solenoid with integral check valve to divert excess fluid flow and to maintain system pressure.

Still another object of the present invention is to provide a method for by-passing excess fluid flow in a hydraulic circuit at times when flow demand is low and pump flow is high while maintaining system pressure.

The above and other objects are accomplished with the employment of a by-pass solenoid with an integral check valve to divert excess fluid flow. The by-pass solenoid according to the present invention comprises a solenoid sub-assembly with a moveable armature constructed to translate with respect to an electrical coil in response to a change in an electrical signal. A valve sub-assembly having a valve body coupled to the solenoid sub-assembly receives a poppet valve member translatable with the armature. The valve sub-assembly includes a valve body with at least an inlet, an outlet, and a by-pass port for directing fluid flow. The valve body has a stepped bore extending therethrough and fluidly connects the inlet, outlet, and by-pass ports. The stepped bore includes at least a first chamber with a check valve assembly disposed therein. The check valve assembly is constructed to fluidly communicate with the inlet, outlet and by-pass ports and to selectively discharge fluid from the desired port.

The hydraulic system in accordance with the present invention includes pump means with at least first and second pumping elements. Each pumping element includes an inlet and an outlet. The first and second inlets receive hydraulic fluid from a system reservoir. The first pumping element of the pump means directs the hydraulic fluid to the first outlet. Likewise, the second pumping element directs the hydraulic fluid to the second outlet. A by-pass solenoid with integral check valve assembly includes an inlet port fluidly connected to the first outlet of the pump means. The by-pass solenoid with integral check valve assembly receives hydraulic fluid therefrom and discharges the fluid through an outlet port fluidly connected to the second outlet of the pump means when the solenoid is in a de-energized position (normal mode of operation). The check valve assembly is constructed to allow hydraulic fluid flow through the check valve assembly to a by-pass port upon actuation of the by-pass solenoid. A controller in electrical communication with the by-pass solenoid actuates the by-pass solenoid from the de-energized position to the energized position (which changes the normal mode of operation to the by-pass mode of operation) to re-direct the flow of hydraulic fluid from the solenoid outlet port to the by-pass port within the solenoid for re-circulating the hydraulic fluid.

The present invention is also directed to a method for regulating excess flow of hydraulic fluid in a hydraulic system comprising the steps of: supplying hydraulic fluid to a first and second pumping element of pump means, each pumping element having an inlet and an outlet; pumping the hydraulic fluid from the first and second pumping elements through first and second outlets of the pump means, connecting an inlet port of a by-pass solenoid to the first outlet of the pump means for receiving hydraulic fluid therefrom; connecting an outlet port of the by-pass solenoid to the second outlet of the pump means for discharging hydraulic fluid therethrough; providing a check valve assembly within a first chamber of the by-pass solenoid, the check valve assembly being fluidly connected to the inlet port and outlet port of the by-pass solenoid; providing a by-pass port in the by-pass solenoid valve capable of being fluidly connected to the inlet port through the check valve assembly upon actuation of the by-pass solenoid; directing the hydraulic fluid from the first outlet into the inlet port of the by-pass solenoid through the check valve assembly and out through the outlet port; and actuating the by-pass solenoid to re-direct hydraulic fluid through the by-pass port of the by-pass solenoid to a selected location.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is described and illustrated.

DETAILED DESCRIPTION OF THE INVENTION

Figure 1:
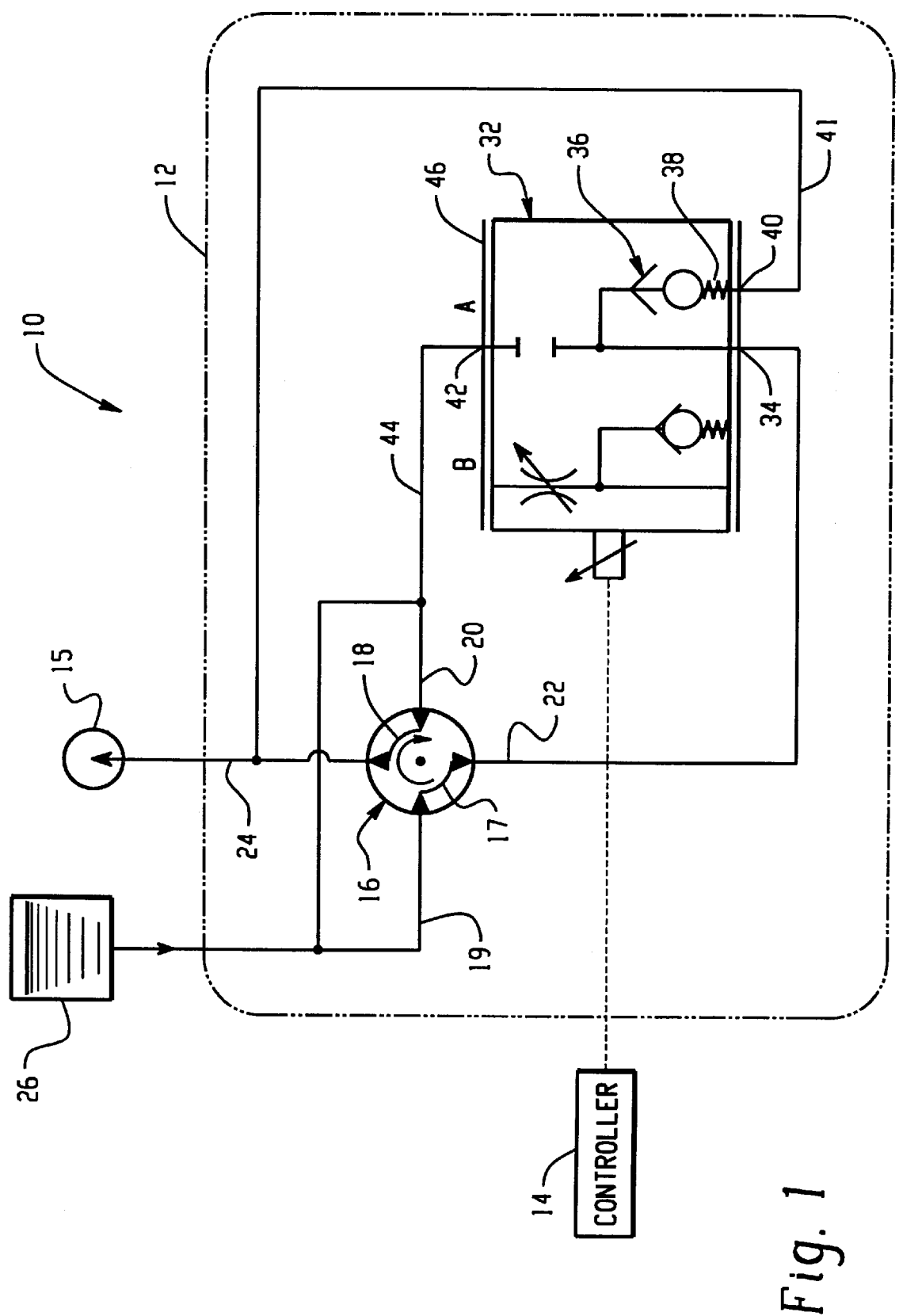
FIG. 1 is a schematic illustration of the hydraulic system in accordance with the present invention.

Referring to the figures, which are not intended to limit the invention and where like numerals designate like or similar features throughout the several views, and first in particular to FIG. 1, there is shown a schematic of a hydraulic system generally designated 10 in accordance with the present invention. System 10 basically comprises a hydraulic circuit 12 and controller 14. While system 10 is particularly suited for use in an electronically controlled automatic transmission system or a continuously variable transmission system having a pump positioned outside of the transmission and directly powered by the engine, hydraulic system 10 may be employed in any hydraulic application or work device schematically designated 15 that requires a diversion of excessive pump flow.

The term "by-pass solenoid" or "solenoid" as employed herein is intended to encompass either a unitary or a unitized fluid control device also commonly referred to as a solenoid actuated valve assembly.

In FIG. 1, a fixed displacement pump 16 has at least a first and second pumping element schematically represented by lines 17, 18 with each pumping element having an inlet 19, 20 and an outlet 22, 24. A suitable pump would include one having two separate pumping elements on a single input shaft. Alternatively, the two pumping elements can be separate with each pumping element having its own inlet and outlet, for example, in a tandem pump arrangement. Any pump means with at least two pumping elements is suitable for use in the present invention.

Pump 16 receives a fluid such as hydraulic fluid from a system reservoir 26 through the first 19 and second 20 inlets and pumps the hydraulic fluid out under pressure through the first 22 and second 24 outlets. The second outlet 24 discharges the hydraulic fluid from the hydraulic circuit 12 to a work device 15 which includes, but is not limited to, an electronically controlled automatic transmission system as is disclosed in U.S. Pat. No. 4,678,006 which is assigned to the Assignee of the present invention and incorporated herein by reference.

A by-pass solenoid (solenoid actuated valve assembly) 32 has an inlet port 34 fluidly connected to the first outlet 22 of the pump 16 and receives hydraulic fluid therefrom. Advantageously, the present invention provides a solenoid 32 that includes an integral check valve assembly 36 therein. The structural details of solenoid 32 and the integral check valve assembly 36 are described in much greater detail later herein with reference to FIGS. 4–8.

Referring back to FIG. 1, in the normal mode of operation of by-pass solenoid 32 also referred to as the closed state or de-energized position or condition, hydraulic fluid flows into the by-pass solenoid 32 through inlet port 34 at a flow rate and pressure sufficient to compress the biasing spring 38 of check valve assembly 36 which opens the check valve and allows the hydraulic fluid to pass therethrough and exit from the outlet port 40 of the by-pass solenoid 32. The normal mode of operation for the by-pass solenoid 32 with integral check valve assembly 36 is illustrated in FIG. 1 as position A.

When fluid flow demand is low, controller 14 responds to preset parameters and/or instructions by actuating by-pass solenoid 32. Controller 14 sends an electrical signal to the by-pass solenoid 32 which actuates the solenoid into a selected (by-pass) mode of operation which is shown in FIG. 1 as position B. The by-pass mode of operation is also referred to herein as the active state or energized position or condition. In the by-pass mode of operation, hydraulic fluid flows from the inlet port 34 of the by-pass solenoid 32 through the by-pass port 42 where it is re-circulated by way of line 44 either back into the second inlet 20 of pump 16, or directly back into the system reservoir 26. In vehicle applications, controller 14 is preferably the vehicle's on-board computer or engine control unit (ECU). However, controller 14 may include, but is not limited to, a microprocessor or computer.

Figure 2:
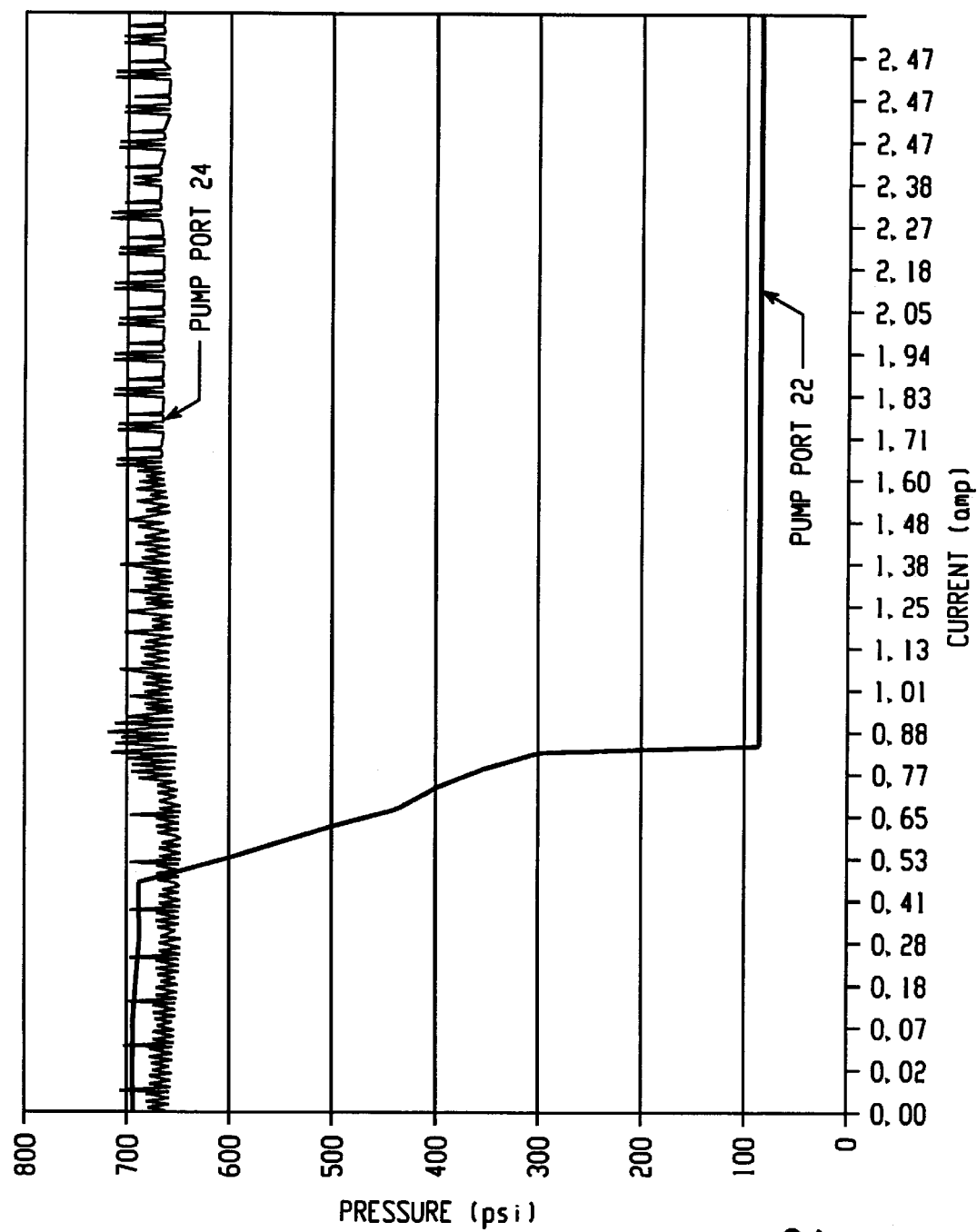
FIG. 2 is a plot of pressure (psi) versus current (amp) for the dual outlets of pump (16)

FIG. 2 is a graph of pressure, in pounds per square inch (psi), versus current, in amperes (amp), and shows the typical pressure performance for the first 22 and the second 24 outlets of pump 16. The pump operating with the by-pass solenoid 32 in the normal mode of operation (the solenoid in the de-energized position schematically represented as A in FIG. 1) is displayed. When the by-pass solenoid 32 is actuated (schematically shown as B in FIG. 1) the pressure of pump outlet 22 decreases to a fairly constant level while the pressure of the pump outlet 24 to the working device remains at the desired system pressure.

Figure 3:
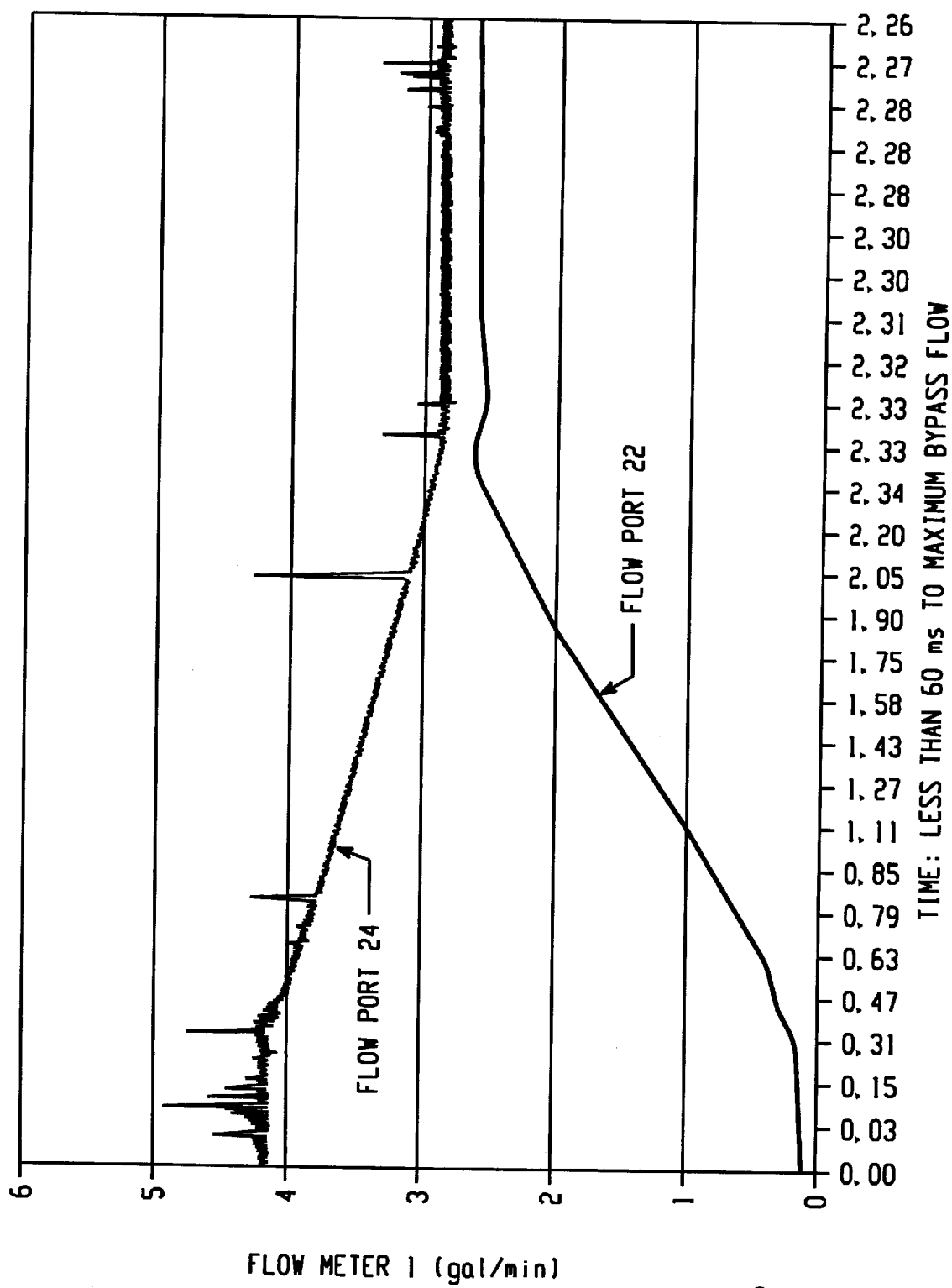
FIG. 3 is a plot of flow (gal/min) versus time (ms) for the dual outlets of pump (16)

FIG. 3 shows the typical flow performance for the first 22 and the second 24 outlets of pump 16 with a graph of flow in gallons per minutes (gal/min) versus time in milliseconds (ms). In the normal mode of operation with by-pass solenoid 32 in its de-energized position, the high flow curve shown on the graph represents the total flow to the working device. The lower flow curve represents ambient flow leakage through the solenoid 32 measured at line 44. Upon actuation of the by-pass solenoid 32 the high flow curve decreases as the lower flow curve increases representative of the by-pass flow capability of the system 10.

Figure 4:
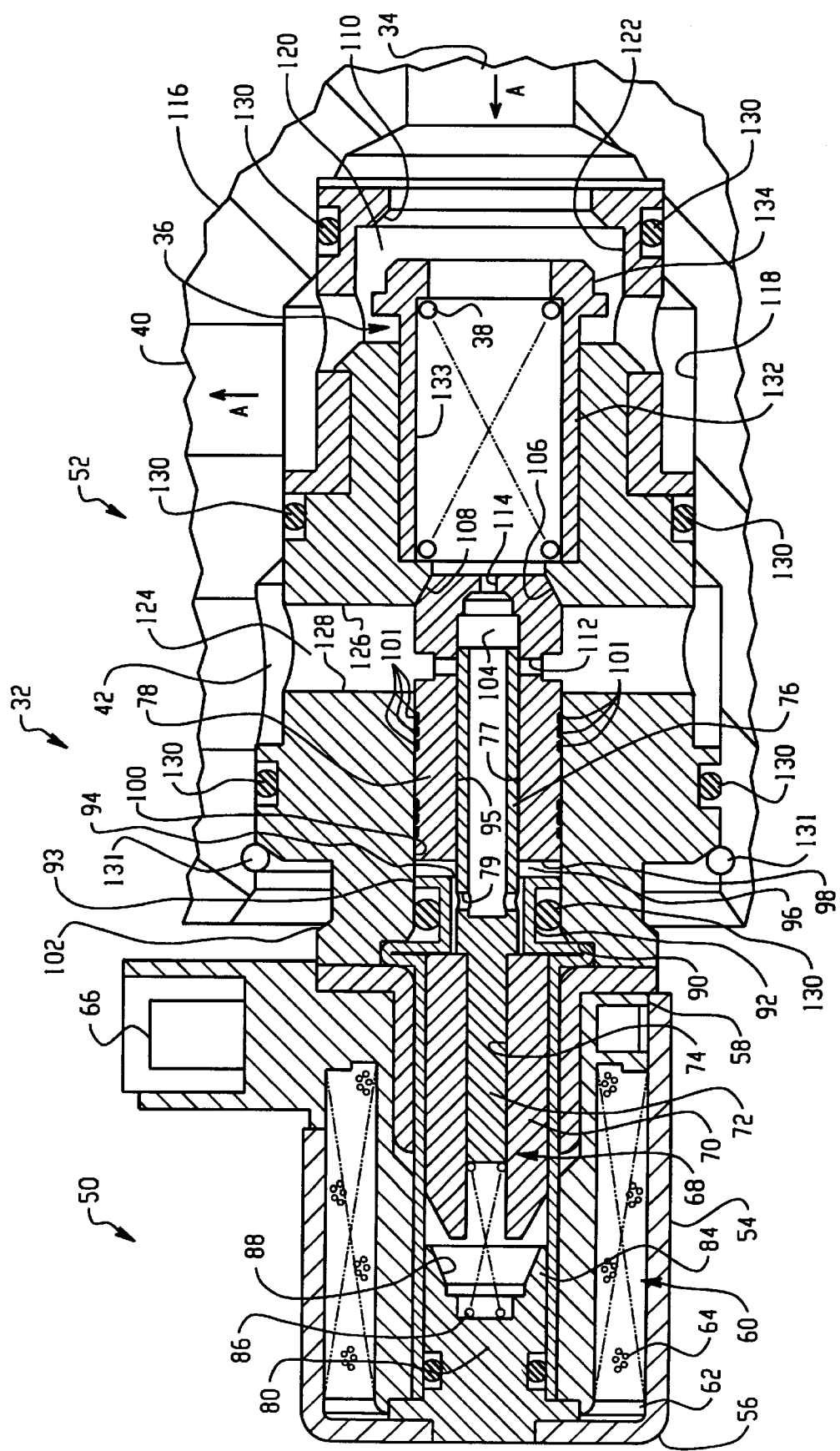
FIG. 4 is a sectional view of the by-pass solenoid with integral check valve assembly in accordance with the preferred embodiment of the present invention.

Referring next to FIG. 4, there is shown a sectional view of the preferred embodiment of the by-pass solenoid 32 with integral check valve assembly 36 according to the present invention. The by-pass solenoid 32 depicted therein is not intended to be limited thereto, but is applicable to any fluid control device either unitized that includes a solenoid sub-assembly and a valve sub-assembly, or more preferably a unitary device which offers a compact package. The by-pass solenoid 32 shown in FIG. 4 has two major sub-assemblies consisting of solenoid sub-assembly 50 and valve sub-assembly 52. The solenoid sub-assembly is a conventional solenoid that is pressure sealed. Solenoid sub-assembly 50 is enclosed by a cup-shaped tubular housing 54 having a generally closed end 56. A disc-like flux collector 58 is situated at an opposite end of housing 54 from closed end 56. An electromagnetic coil assembly 60 is disposed within housing 54 and comprises a spool-shaped bobbin 62 on which an electrically-conductive coil 64 is wound. As is conventional in this art, bobbin 62 is made of an electrically non-conductive and non-magnetic material, such as nylon. The terminal ends of coil 64 are electrically connected to a pair of blade-type terminals 66 (only one shown). The blade-type terminal 66 is constructed as is known in the art to be electrically connected to controller 14 by way of a suitable wiring harness (not shown).

Also, contained within housing 54 is an armature assembly 68 which comprises an armature body 70 and an elongated pin 72. The elongated pin 72 is rigidly held within a longitudinal bore 74 of the armature body 70. Pin 72 has one end 76 which extends out of armature body 70. First end 76 includes a bore 77 therein and preferably has a larger outer diameter on the portion that extends out of the armature body 70. First end 76 slidably receives poppet valve member 78 of the valve sub-assembly 52. First end 76 further includes a transverse aperture 79 situated in a rear portion of the first end 76. Pin 72 is constructed to translate with the armature body 70 within a magnetic pole piece 80 attached to the closed end 56 of housing 54. Pole piece 80 is press fit or threadably received within a central bore 82 formed in the closed end 56 of housing 54. Pole piece 80 includes a collar 84 surrounding armature body 70 which generally supports longitudinal movement of the armature body 70 and pin 72 therein. A biasing spring 86 is disposed within a recess 88 of pole piece 80 and is constructed to biasly urge the pin 72 and armature body 70 up against a radially extending shoulder 90 of collar 84.

Collar 84 includes an extension 92 that axially surrounds a portion of first end 76 of pin 72. Extension 92 terminates in an outwardly radially extending shoulder 93. The inner diameter of extension 92 is larger than the outer diameter of first end 76 so as to form an annulus 94 thereabout.

Poppet valve member 78 has a generally cylindrical configuration with a bore 95 having an inner diameter that slidably receives the outer surface of the first end 76 of pin 72. Poppet valve member 78 is constructed to translate axially over the first end 76 of pin 72. Poppet valve member 78 is positioned on the first end 76 of pin 72 to provide a rear fluid chamber 96 defined by the end surface 98 of poppet valve member 78 and the outer surface of the first end 76 within the confines of a bore 100 in poppet valve support wall 102 and the end surface of the shoulder 93 of collar extension 92. Poppet valve member 78 is further situated on the first end 76 of pin 72 to provide for a front fluid chamber 104. A tapered forward end 106 of poppet valve member 78 has tapered surfaces that correspond with a poppet valve seat 108. The forward end 106 of poppet valve member 78 includes a transverse opening 112 therethrough and a forward channel 114 for fluid communication with front fluid chamber 104.

In the normal mode of operation (or de-energized position) of by-pass solenoid 32, spring 86 resiliently urges pin 72, and poppet valve member 78 received thereon against the poppet valve seat 108. In this position, the transverse opening 112 is closed by the outer surface of first end 76 as seen in FIG. 4. Forward channel 114 allows fluid to enter and fill front fluid chamber 104. Fluid passes through poppet valve bore 77 and exits transverse aperture 79 to enter and fill the rear fluid chamber 96. As both chambers 96, 104 fill with fluid, the fluid pressure exerts a force that moves the tapered forward end 106 up tightly against poppet valve seat 108. The fluid pressure assists in sealing the poppet valve member 78 against the poppet valve seat 108.

Controller 14 applies current at a selected time to the coil assembly 60 which energizes and induces a magnetic field that provides a flux path to effect translational movement of the armature body 70 against the force of the biasing spring 86. Movement of the armature body 70 effects longitudinal translational movement of pin 72 simultaneously therewith which moves the first end 76 away from the transverse opening 112 which then allows fluid to exit therefrom. The fluid pressure exerted on the poppet valve member 78 causes member 78 to open. The outer surface of a portion of poppet valve member 78 preferably has hydraulic balancing grooves 101 which fluidly assist movement and performance of poppet valve member 78.

It should be understood that solenoid sub-assembly 50 may be constructed in a variety of ways to achieve translational movement of pin 72. For example, U.S. Pat. Nos. 4,947,893; 5,261,637; 5,513,673; 5,513,832; 5,669,406; and 5,853,028 all assigned to the Assignee of the present invention and hereby incorporated by reference disclose various structures of solenoids suitable for use to effect translational movement of pin 72 and first end 76 as in the present invention.

Valve sub-assembly 52 is enclosed by valve body 116. Valve body 116 comprises at least three fluidly interconnected ports, including but not limited to, the inlet port 34, the outlet port 40, and by-pass port 42. Inlet port 34 is depicted as being substantially aligned longitudinally with the longitudinal axis defined by the elongated pin 72 and poppet valve member 78. It should be understood that other orientations are suitable as long as there is fluid communication between the ports. A stepped bore 118 extends through the valve body 116 and connects inlet port 34 with solenoid sub-assembly 50. In the preferred embodiment, the poppet valve support wall 102, poppet valve seat 108, and check valve seat 110 comprise a one piece assembly received within the stepped bore 118. Valve body 116 has a first chamber 120 defined by the stepped bore 118 and an inner surface 122 of the check valve seat 110. Valve body 116 further includes a second chamber 124 defined by the stepped bore 118 and by an end surface 126 of the poppet valve seat 108 and an end surface 128 of poppet valve support wall 102 disposed within stepped bore 118. Poppet valve support wall 102, poppet valve seat 108, and check valve seat 110 may be threadably engaged within stepped bore 118, or press or slip fit therein and retained with a snap-ring 131. Optional, O-rings 130 may be provided for a secure pressure seal. Solenoid sub-assembly 50 is attached to the poppet valve support wall 102 by way of fasteners, tabs, or the like, including but not limited to, threadable engagement, staking operation, interference press fit engagement, or similar process.

Figure 5:
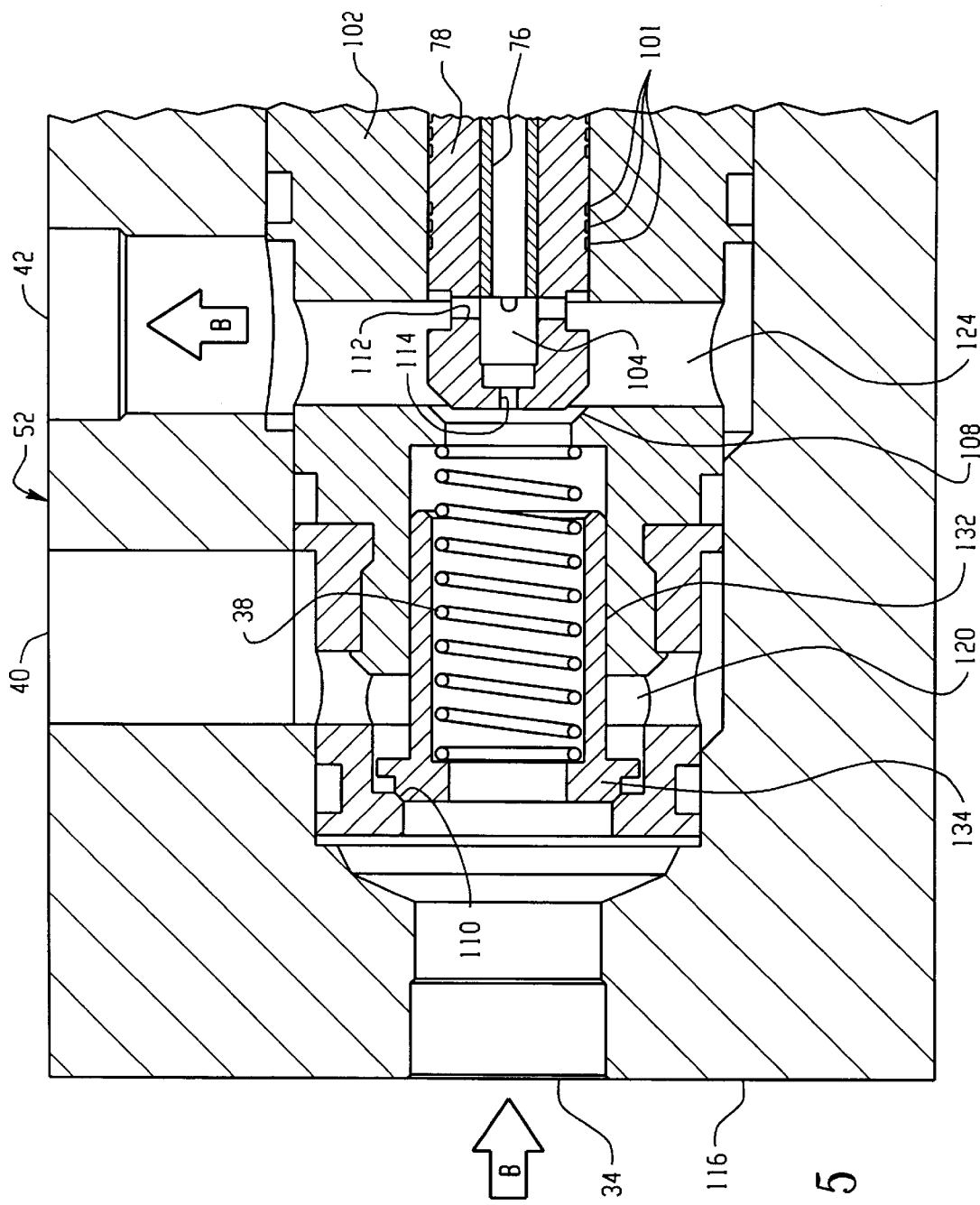
FIG. 5 is a sectional view shown from the reverse side of a portion of the by-pass solenoid of FIG. 4 in an energized position.

Check valve assembly 36 is disposed within the first chamber 120. In the preferred embodiment shown in FIG. 4, check valve assembly 36 is in substantial axial alignment with the inlet port 34 and poppet valve member 78. Check valve assembly 36 comprises a barrel member 132 with a bore 133 therethrough and a stepped check valve 134 at one end. A spring 38 biasing the check valve assembly in a closed position is disposed within the barrel member 132, and is supported at one end by portions of the poppet valve seat 108. The other end of spring 38 is retained by the stepped check valve 134. When check valve assembly 36 is closed (as seen in FIG. 5), fluid flow is prevented from entering the first chamber 120 due to contact of the stepped check valve 134 on the check valve seat 110. Barrel member 132 seals first chamber 120. Fluid is allowed to flow through bore 133 of barrel member 132, and fluidly communicate with the second chamber 124 through the poppet valve member 78 as shown by the arrows B in FIG. 5.

In the normal mode of operation with the solenoid 32 in the de-energized position, the force of fluid pressure exerted on stepped check valve 134 sufficient to overcome the biasing force of spring 38 causes check valve 134 to open which allows fluid to flow into the first chamber 120 and exit outlet port 40 as shown by the arrows A in FIG. 4.

Ports 34, 40, and 42 may be constructed for threadable engagement of fluid lines into the valve body 116, or alternatively be constructed to receive and engage "quick connect" connectors for fluid lines suitable in this field of technology.

Figure 6:
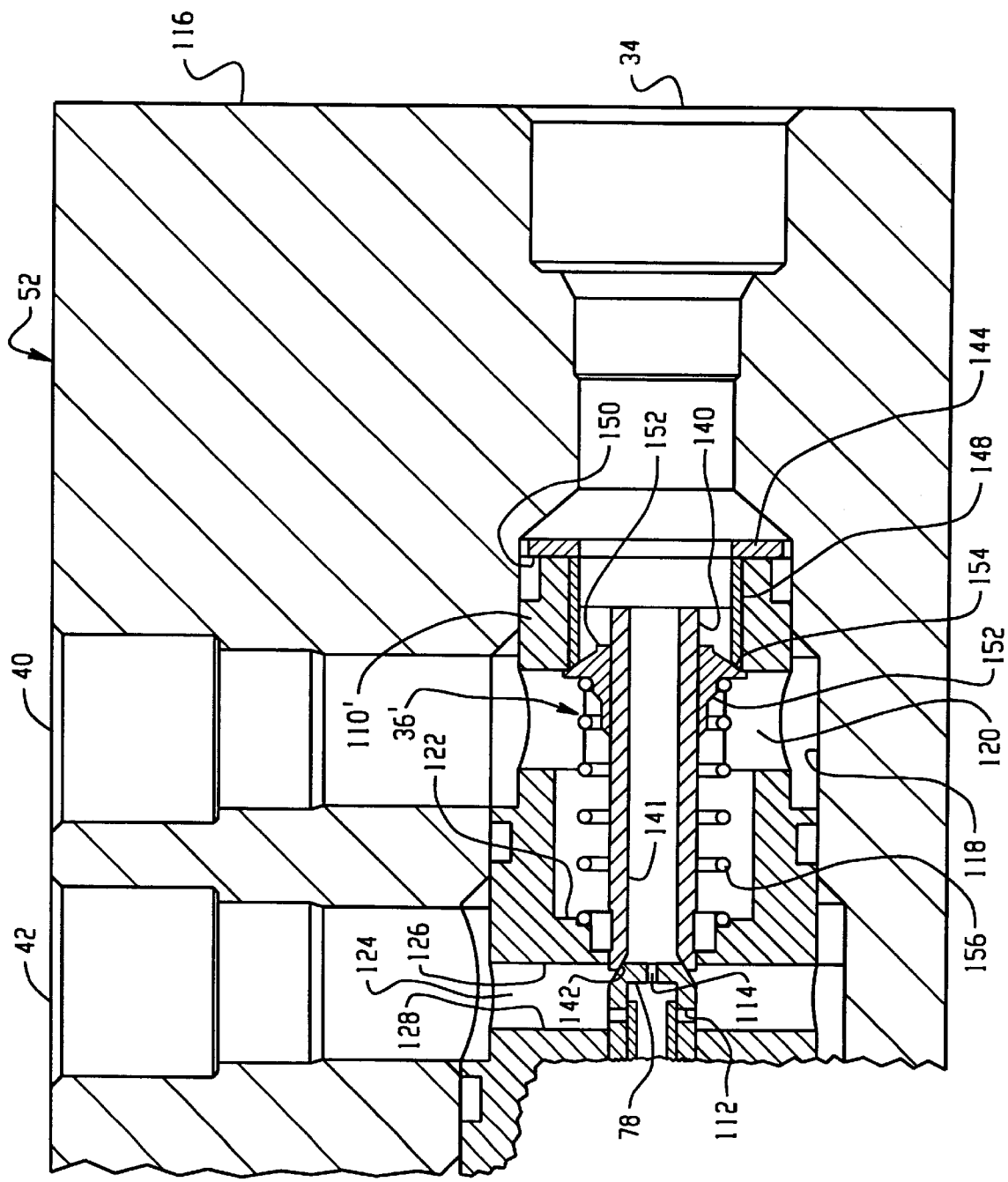
FIG. 6 is a sectional view of an alternate embodiment of the check valve assembly in accordance with the present invention prior to any fluid entry.
Figure 7:
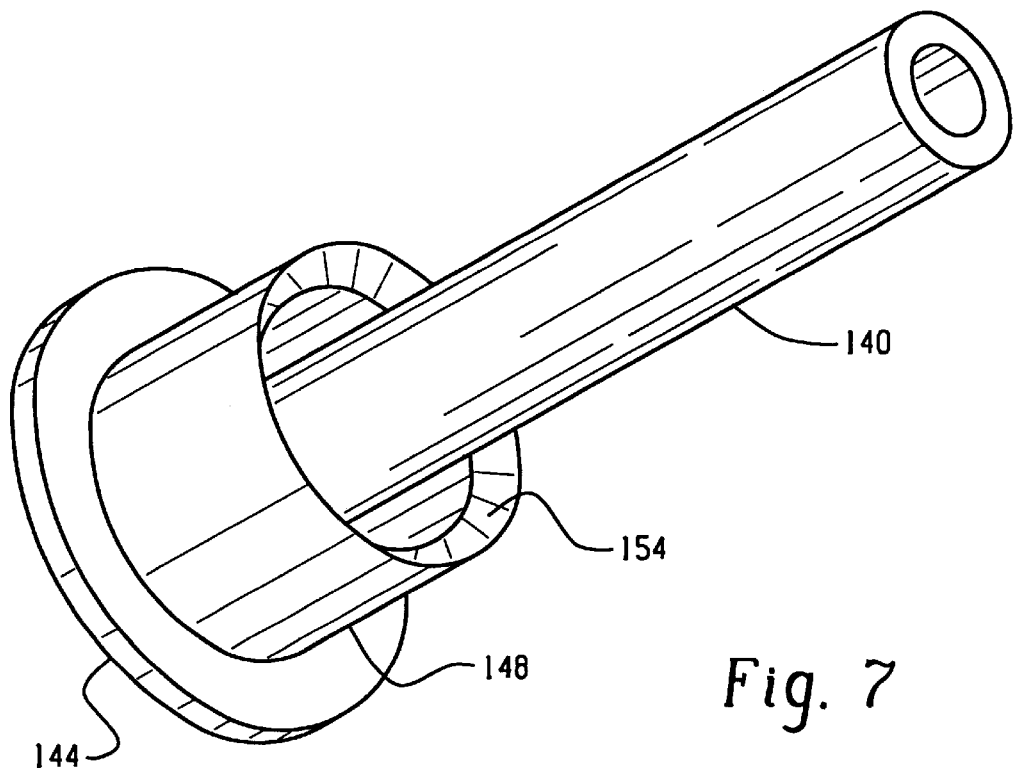
FIG. 7 is a elevated side view of barrel member (140) from FIG. 6.
Figure 8:
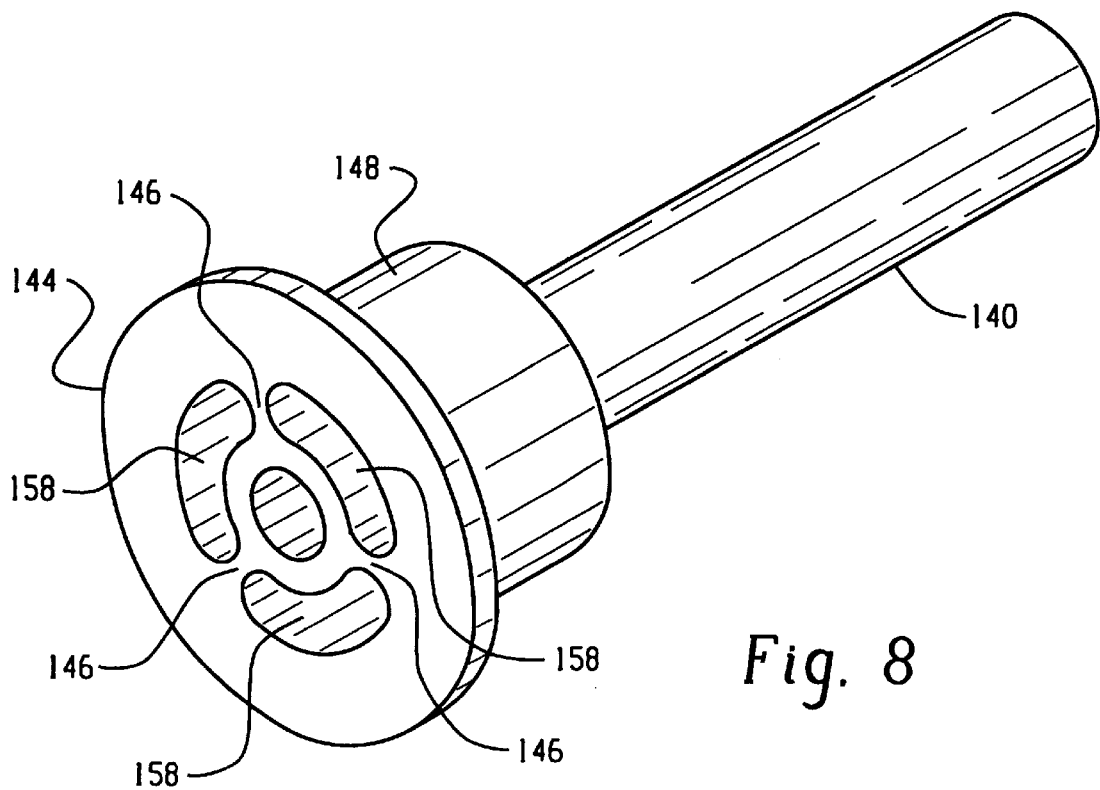
FIG. 8 is an elevated frontal view of barrel member (140) from FIG. 6.

Referring next to FIGS. 6–8, there is shown an alternate embodiment of the check valve assembly 36' according to the present invention. A barrel member 140 having a bore 141 of the check valve assembly 36' is disposed within the first chamber 120 in substantial axial alignment with the inlet port 34 and the poppet valve member 78. Barrel member 140 has a poppet valve seat 142 at one end that corresponds to the poppet valve member 78 for providing a seal therewith. The opposite end of barrel 140 includes a radially extending hub 144 attached to the barrel member 140 by a plurality of spokes 146 as best seen in FIG. 8. An annular cylindrical segment 148 having a smaller diameter than hub 144 extends axially along a portion of barrel member 140. As mentioned earlier, barrel member 140 is disposed within the first chamber 120 and is secured therein by placement of hub 144 in a recessed portion 150 of stepped bore 118 corresponding to the outer diameter of hub 144. Hub 144 is secured therein by check valve seat 110' which may be threadably engaged within recessed portion 150 of stepped bore 118 or simply press fit therein. Check valve seat 110' has an inner annular diameter corresponding to that of the outer surface diameter of annular segment 148, and is positioned to retain segment 148 within recess 150. Check valve 152 is coaxially located on the outer surface of barrel member 140. Check valve 152 includes a radially extending and tapered portion constructed to sealingly engage a corresponding tapered surface at an end 154 of annular segment 148. A biasing spring 156 axially surrounds barrel member 140 and resiliently biases check valve 152 against the tapered surface end 154 of segment 148. A plurality of passages 158 allow fluid communication between inlet port 34 and first chamber 120 when the check valve 152 is in a retracted or open position.

In the operation of the by-pass solenoid 32 according to the present invention, hydraulic fluid is pumped into the inlet port 34. As the fluid pressure of the hydraulic fluid pushing against check valve 134, 152 exerts a force that exceeds the biasing force of coil spring 38, 156, the check valve 134, 152 moves with the compression of the coil spring 38, 156. This movement allows hydraulic fluid to enter the first chamber 120, and exit outlet port 40 for performing work as shown in position A in FIG. 1, and represented by the arrows A in FIG. 4. This manner of operation represents the normal mode of operation (de-energized position of by-pass solenoid 32) FIG. 4 shows a sectional view of the by-pass solenoid 32 in this position.

As vehicle engine speed increases, the pump flow increases, but the flow demand of hydraulic fluid decreases since either the transmission is in high gear, or in power assist steering applications, the power steering system requires little variable assist. The engine control unit (ECU) or controller 14 senses these conditions with a speed sensor (not shown) and provides an electrical signal to actuate the solenoid sub-assembly 50 which causes the pin 72 to translate longitudinally and open the transverse opening 112. Hydraulic fluid now flows through the forward channel 114 through the front fluid chamber 104 into and out from second chamber 124. The fluid pressure flowing into second chamber 124 exerts a force that causes poppet valve member 78 to translate axially on first end 76 of pin 72 which allows still more hydraulic fluid to flow in the second chamber 124 and exit through the by-pass port 42. As the hydraulic fluid flows into the second chamber 124, the force exerted by the fluid on the check valve 134, 152 decreases to an extent that the biasing force of coil spring 38, 1 56 now urges check valve 134, 152 against the check valve seat 110, 110' which seals off most, if not all, of the hydraulic fluid flow into the first chamber 120. The hydraulic fluid is now being re-circulated either back to the system reservoir 26 or pump inlet 20 as desired while system pressure is being maintained at a fairly constant pressure. This manner of operation represents the energized position or active state of the by-pass solenoid 32 as shown in position B in FIG. 1, and represented by arrows B in FIG. 5.

When hydraulic fluid flow demand becomes high again, for example, as the pump flow decreases due to a slower engine speed, controller 14 senses this condition and terminates the electrical signal to the solenoid sub-assembly 50 which causes spring 86 to urge pin 72 and first end 76 forward to block the transverse opening 112 of poppet valve member 78. As the first end 76 of pin 72 moves forward, the poppet valve member 78 positioned thereon also moves forward towards the poppet valve seat 108. As the fluid pressure increases in the front and rear fluid chambers 104, 96, the force of the fluid pressure closes the poppet valve member 78 and provides a sealing engagement with the poppet valve seat 108 sealing off hydraulic fluid flow into the second chamber 124. The pressure exerted by the hydraulic fluid once again will exceed the biasing force of check valve spring 38, 156 and allow hydraulic fluid to flow into the first chamber 120.

In the above manner, the present invention provides a by-pass solenoid with integral check valve for use in a hydraulic system and method that by-passes or bleeds excess pump flow while allowing the system to maintain a fairly constant pressure. The check valve assembly 36 inhibits re-circulated fluid from entering the working hydraulic circuit. The present invention is particularly suited for use in an electronically controlled automatic transmission system for a vehicle where the fluid pump operates based on engine speed. The present invention reduces the overall horsepower consumption of a vehicle and provides an improvement in miles per gallon (MPG) and fuel consumed. In other applications like in a stationary hydraulic system, the present invention can reduce the size of the motor that drives a pump. The solenoid sub-assembly 50 is made from materials known in that art. Similarly, the valve sub-assembly 52 may be made from materials known in the art including, but not limited to ferrous or non-ferrous metal like hardened steel. The poppet valve support wall 102 is constructed of ferrous metal.

While specific embodiments of the invention have been shown and described in detail to illustrate the application of the principles of the invention, it will be understood that the invention may be embodied otherwise without departing from such principles.

I claim:

1. A by-pass solenoid (32), comprising:
   a solenoid sub-assembly (50) having a movable armature (70) constructed to translate with respect to an electrical coil (64) in response to a change in an electrical signal being applied to said electrical coil (64); and
   a valve sub-assembly (52), said valve sub-assembly (52) including a valve body (116) coupled to said solenoid sub-assembly (50) and receiving a poppet valve member (78) translatable with said armature (70),
   said valve body (116) having at least an inlet port (34), an outlet port (40), and a by-pass port (42) therein, said valve body (116) having a stepped bore (118) extending therethrough, said stepped bore (118) being fluidly connected to said inlet port (34), said outlet port (40), and said by-pass port (42), said stepped bore (118) having at least a first chamber (120) fluidly connected to said inlet port (34) and said outlet port (40), said valve sub-assembly (52) further including a check valve assembly (36) disposed within said first chamber (120), said check valve assembly (36) being constructed to fluidly communicate with said inlet port (34), said outlet port (40), and said by-pass port for selectively discharging fluid from a desired port of said valve sub-assembly (52).

2. A by-pass solenoid (32) according to claim 1, wherein said check valve (36) comprises:
   a barrel member (132) having a bore (133) therethrough, said barrel member (132) being positioned within said first chamber (120);
   a stepped check valve (134) connected to said barrel member (132) and being constructed to engage a check valve seat (110) to prevent fluid flow from entering said outlet port (40); and
   a coil spring (38) situated within said barrel member (132) and engaged on one end by a portion of said stepped check valve (134) and said poppet valve seat(108) on the other end for exerting a biasing force on said stepped check valve (134) towards said inlet port (34).

3. A by-pass solenoid (32) according to claim 1, wherein said poppet valve member (78) comprises a forward channel (114), said forward channel providing fluid communication between said first chamber (120) and a front fluid chamber (104) within said poppet valve member (78).

4. A by-pass solenoid (32) according to claim 3, further comprising a pin (72) connected to said armature (70), said pin (72) having a first end (76) with a bore (77) therein, said first end (76) having a transverse aperture (79) in a rear portion of said first end (76) for fluid communication between said front fluid chamber (104) and a rear fluid chamber (96).

5. A by-pass solenoid (32) according to claim 4, further comprising a transverse opening (112) in said poppet valve member (78), said first end (76) of said pin (72) extending in a de-energized position of said solenoid sub-assembly (50) to block said transverse opening (112), said first end (76) of said pin (72) uncovering said transverse opening (112) in an energized position of said solenoid sub-assembly for allowing fluid communication with a second chamber (124) located in said stepped bore (118).

6. A by-pass solenoid (32) according to claim 1, further comprising a second chamber (124) situated within said stepped bore (118), said second chamber (124) fluidly communicating with said first chamber (120) through said poppet valve member (78).

7. A by-pass solenoid (32) according to claim 1, wherein said check valve assembly (36') comprises:
   a barrel member (140) having a bore (141) therethrough, said barrel member (140) being positioned within said first chamber (120) in substantial axial alignment with said poppet valve member (78) and said inlet port (34);
   a check valve (152) coaxially surrounding said barrel member (140) and translatable thereon, said check valve (152) being constructed to engage and prevent flow from said inlet port (34); and
   a coil spring (156) concentrically arranged around said barrel member (140) and engaged by a portion of said check valve (152) for exerting a biasing force on said check valve (152) towards said inlet port (34).

8. A by-pass solenoid (32) according to claim 7, wherein said barrel member (140) further comprises a radially extending hub (144) with a plurality of spokes (146) at one end, said radially extending hub being disposed within a recessed portion (150) of said stepped bore (118), said radially extending hub (144) having an annular segment (148) extending axially therefrom, said annular segment (148) having a smaller outer diameter than that of said radially extending hub (144), an inner diameter of said annular segment (148) and said plurality of spokes (146) defining passages for fluid from said inlet port (34) around an outer diameter of said barrel member (140).

9. A by-pass solenoid (32) according to claim 8, wherein said barrel member (140) includes a poppet valve seat (142) at an opposite end from said radially extending hub (144) tapering inwardly towards the end with said radially extending hub (144), and said poppet valve member (78) includes a tapered end (106) corresponding to poppet valve seat (142) of said barrel member (140) for providing a sealing engagement therewith.

10. A by-pass solenoid (32) according to claim 9, wherein said annular segment (148) of said radially extending hub (144) comprises a tapered end (154) at an opposite end from said hub (144), and said check valve (152) comprises a tapered surface corresponding with the tapered end (154) of said annular segment (148) for providing a sealing engagement therewith.

11. A hydraulic system (10) for by-passing pump flow, comprising:

pump means (16) having at least a first and a second pumping element (17, 18), each pumping element having an inlet (19, 20) and an outlet (22, 24), said first and second inlets (19, 20) receiving hydraulic fluid from a system reservoir (26), said first pumping element (17) directing the hydraulic fluid to the first outlet (22), said second pumping element (18) directing the hydraulic fluid to the second outlet (24);

a by-pass solenoid (32) having an inlet port (34) fluidly connected to said first outlet (22) of said pump means (16) for receiving hydraulic fluid therefrom, said by-pass solenoid (32) further having an outlet port (40) fluidly connected to said second outlet (24), said by-pass solenoid (32) further having a check valve assembly (36) situated in a first chamber (120) therein and constructed to receive flow of hydraulic fluid therethrough in a de-energized position of said by-pass solenoid (32) and discharge the hydraulic fluid to an outlet port (40), said check valve assembly (36) being further constructed to allow hydraulic fluid flow through the check valve assembly (36) to a by-pass port (42) upon actuation of said by-pass solenoid (32); and a controller (14) in electrical communication with said by-pass solenoid (32) for actuating said solenoid (32) from the de-energized position to the energized position to re-direct flow of hydraulic fluid out from the by-pass solenoid by-pass port (42) for re-circulation.

12. A hydraulic system (10) according to claim 11, wherein a fluid line (41) connects the check valve outlet port (40) of said by-pass solenoid (32) to said second outlet (24) of said pump means (16).

13. A hydraulic system (10) according to claim 12, wherein a fluid line connects said first outlet (22) of said pump (16) to said inlet port (34) of said by-pass solenoid valve (32).

14. A hydraulic system (10) according to claim 13, wherein said solenoid sub-assembly (50) comprises an ON/OFF solenoid.

15. A hydraulic system (10) according to claim 13, wherein said solenoid sub-assembly (50) comprises a variable flow solenoid.

16. A hydraulic system (10) according to claim 15, wherein said solenoid sub-assembly (50) is in electrical communication with said controller (14) and responsive thereto for regulating excess flow of hydraulic fluid through a fluid line (44) connecting said by-pass port (42) of said by-pass solenoid to a selected location (20, 26).

17. A method for regulating excess flow of hydraulic fluid in a hydraulic circuit (12), comprising the steps of:

supplying hydraulic fluid to a first and second pumping element (17, 18) of pump means (16), each pumping element having an inlet (19, 20) and an outlet (22, 24);

pumping the hydraulic fluid from the first and second outlet (22, 24) of the pump means (16);

connecting an inlet port (34) of a by-pass solenoid (32) to the first outlet (22) of the pump means (16) for receiving hydraulic fluid therefrom;

connecting an outlet port (40) of the by-pass solenoid (32) to the second outlet (24) of the pump means for discharging hydraulic fluid therethrough;

providing a check valve assembly (36) within a first chamber (120) of the by-pass solenoid (32), the check valve assembly (36) being fluidly connected to the inlet port (34) and the outlet port (40) of the by-pass solenoid (32);

providing a by-pass port (42) in the by-pass solenoid valve (32) capable of being fluidly connected to the inlet port (34) through the check valve assembly (36) upon actuation of the by-pass solenoid (32);

directing the hydraulic fluid from the first outlet (22) into the inlet port (34) of the by-pass solenoid (32) through the check valve assembly (36) and out through the outlet port (40); and actuating the by-pass solenoid (32) to re-direct excess hydraulic fluid through the by-pass port (42) of the by-pass solenoid (32) to a selected location (20, 26).

18. A method according to claim 17, further comprising the step of providing a controller (14) for actuating the by-pass solenoid (32).

19. A method according to claim 18, wherein the selected location comprises the system reservoir (26).

20. A method according to claim 17, wherein the selected location comprises the second inlet (20) of the at least one pump (16).

* * * * *